United States Patent
Wang et al.

(10) Patent No.: US 12,012,832 B1
(45) Date of Patent: Jun. 18, 2024

(54) METHOD AND SYSTEM FOR PREDICTING TIME-VARYING PRINCIPLE OF WATERFLOODING OIL RESERVOIR FORMATION PARAMETERS

(71) Applicant: CHINA UNIVERSITY OF PETROLEUM (EAST CHINA), Qingdao (CN)

(72) Inventors: Sen Wang, Qingdao (CN); Kun Wang, Qingdao (CN); Qihong Feng, Qingdao (CN); Shunming Li, Qingdao (CN); Yijing Du, Qingdao (CN); Zheng Wu, Qingdao (CN); Xiang Wang, Qingdao (CN); Jiyuan Zhang, Qingdao (CN); Xianmin Zhang, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 18/226,472

(22) Filed: Jul. 26, 2023

(30) Foreign Application Priority Data

Nov. 28, 2022 (CN) .......................... 202211495714.5

(51) Int. Cl.
*E21B 43/16* (2006.01)
*G01N 15/08* (2006.01)
(Continued)

(52) U.S. Cl.
CPC ....... *E21B 43/162* (2013.01); *G01N 15/0826* (2013.01); *G06F 30/28* (2020.01); *G06F 2113/08* (2020.01)

(58) Field of Classification Search
CPC ....... E21B 43/16; E21B 43/162; G01N 15/00; G01N 15/08; G01N 15/0826; G01N 24/08; G01N 33/24; G06F 30/28; G06F 2113/08
See application file for complete search history.

(56) References Cited

FOREIGN PATENT DOCUMENTS

| AU | 2021104861 A4 | * | 9/2021 | ............. G01N 13/04 |
| CN | 110231268 B | * | 7/2022 | ......... G01N 15/0826 |

(Continued)

OTHER PUBLICATIONS

Machine Translation of CN 110231268 B (Year: 2022).*
(Continued)

*Primary Examiner* — Nguyen Q. Ha
(74) *Attorney, Agent, or Firm* — Amster, Rothstein & Ebenstein LLP

(57) ABSTRACT

The present disclosure relates to a method and system for predicting a time-varying principle of waterflooding oil reservoir formation parameters. Firstly, a $T_2$ spectrum-pore size relation model is built according to a measured pore size distribution curve and a measured $T_2$ spectrum. A $T_2$ spectrum of a rock sample at different water injection amounts during a waterflooding physical simulation experiment is acquired. The acquired $T_2$ spectrum at different water injection amounts is then converted into a pore size distribution at different water injection amounts, and a pore network model at different water injection amounts is built with the pore size distribution. Oil-water two-phase flow simulation is performed, and a corresponding oil-water two-phase relative permeability curve of the rock sample at different pore volume (PV) multiples is obtained eventually. The oil-water two-phase relative permeability curve is the formation parameters in the waterflooding oil reservoir.

6 Claims, 10 Drawing Sheets

(51) Int. Cl.
  *G01N 33/24* (2006.01)
  *G06F 30/28* (2020.01)
  *G06F 113/08* (2020.01)

(56) References Cited

FOREIGN PATENT DOCUMENTS

| CN | 115078163 A | * | 9/2022 |
| CN | 115452531 A | * | 12/2022 |
| CN | 115753864 A | * | 3/2023 |

OTHER PUBLICATIONS

Machine Translation of CN 115078163 A (Year: 2022).*
Machine Translation of CN 115452531 A (Year: 2022).*
Machine Translation of CN 115753864 A (Year: 2023).*
First Office Action issued in Chinese Patent Application No. 202211495714.5, dated Jan. 4, 2023.
Research on oil-water seepage flow law in low permeability reservoir based on nuclear magnetic resonance and indoor phase permeability experiments Liu Zhuo, (Chinese Master's Theses Full-Text Database Engineering Science and Technology I), Published Nov. 15, 2019.
Method for determination of relative permeability of two-phase fluids in rocks, Test method for two phase relative permeability in rock (Oil and gas industry standards of the People's Republic of China), Released on Oct. 8, 2007.

* cited by examiner

METHOD AND SYSTEM FOR PREDICTING TIME-VARYING PRINCIPLE OF WATERFLOODING OIL RESERVOIR FORMATION PARAMETERS

CROSS-REFERENCE TO RELATED APPLICATIONS

This patent application claims the benefit and priority of Chinese Patent Application No. 202211495714.5, filed with the China National Intellectual Property Administration on Nov. 28, 2022, the disclosure of which is incorporated by reference herein in its entirety as part of the present application.

TECHNICAL FIELD

The present disclosure relates to the technical field of oil-gas field development, and in particular, to a method and system for predicting a time-varying principle of waterflooding oil reservoir formation parameters.

BACKGROUND

During a long-term waterflooding process, a pore structure of a reservoir changes gradually, causing an absolute permeability, an oil-water two-phase relative permeability curve and the like of the reservoir to change correspondingly. Such parameters lay a foundation for the design of an oil reservoir development and adjustment scheme and also are preconditions of the numerical simulation of an oil reservoir and the application of various oil reservoir engineering methods. Accordingly, the accurate prediction on a changing principle of formation parameters with time is of great significance for the dynamic prediction and production optimization of oil reservoir development.

However, most of the current techniques can only obtain a changing principle of a reservoir permeability with time and cannot obtain a changing principle of an oil-water two-phase relative permeability curve of the reservoir with time.

Therefore, there is an urgent need in the art for a technical solution that allows simultaneous measurement of a permeability changing principle and a relative permeability curve changing principle of a given rock sample.

SUMMARY

An objective of the present disclosure is to provide a method and system for predicting a time-varying principle of waterflooding oil reservoir formation parameters. A $T_2$ spectrum at different water injection amounts is converted into a pore size distribution, and a pore network model at different water injection amounts is built with the pore size distribution. Oil-water two-phase flow simulation is then performed, and a corresponding oil-water two-phase relative permeability curve of a rock sample at different water injection amounts is obtained eventually. The problem of being difficult to simultaneously measure a permeability changing principle and a relative permeability curve changing principle of a given rock sample in the prior art is effectively solved, and therefore, a time-varying principle of formation parameters can be predicted accurately.

To achieve the above objective, the present disclosure provides the following solutions:

A method for predicting a time-varying principle of waterflooding oil reservoir formation parameters includes:

acquiring a measured pore size distribution curve and a measured $T_2$ spectrum of a rock sample of a waterflooding oil reservoir;

building a measured $T_2$ spectrum-pore size relation model according to the measured pore size distribution curve and the measured $T_2$ spectrum;

acquiring a $T_2$ spectrum of the rock sample at different water injection amounts during a waterflooding physical simulation experiment;

obtaining a pore size distribution curve at different water injection amounts by using the measured $T_2$ spectrum-pore size relation model according to the $T_2$ spectrum of the rock sample at different water injection amounts;

building a mathematical model of the pore size distribution curve changing with water injection parameters of the rock sample according to the pore size distribution curve at different water injection amounts, where the water injection parameters of the rock sample include a water injection amount, an initial permeability of the rock sample, an average water injection rate, an initial porosity, a clay type, an initial clay content, and a median particle size;

building a pore network model at different water injection amounts according to the mathematical model;

performing oil-water two-phase flow simulation by using the pore network model at different water injection amounts, and calculating a corresponding oil-water two-phase relative permeability curve of the rock sample at different water injection amounts, where the oil-water two-phase relative permeability curve is waterflooding oil reservoir formation parameters.

The present disclosure further provides a system for predicting a time-varying principle of waterflooding oil reservoir formation parameters, including:

an initial data acquiring module configured to acquire a measured pore size distribution curve and a measured $T_2$ spectrum of a rock sample of a waterflooding oil reservoir;

a model building module configured to build a measured $T_2$ spectrum-pore size relation model according to the measured pore size distribution curve and the measured $T_2$ spectrum;

a $T_2$ spectrum acquiring module configured to acquire a $T_2$ spectrum of the rock sample at different water injection amounts during a waterflooding physical simulation experiment;

a pore size distribution curve creating module configured to obtain a pore size distribution curve at different water injection amounts by using the measured $T_2$ spectrum-pore size relation model according to the $T_2$ spectrum of the rock sample at different water injection amounts;

a mathematical model building module configured to build a mathematical model of the pore size distribution curve changing with water injection parameters of the rock sample according to the pore size distribution curve at different water injection amounts, where the water injection parameters of the rock sample include a water injection amount, an initial permeability of the rock sample, an average water injection rate, an initial porosity, a clay type, an initial clay content, and a median particle size;

a pore network model building module configured to build a pore network model at different water injection amounts according to the mathematical model;

a permeability calculating module configured to perform oil-water two-phase flow simulation by using the pore network model at different water injection amounts, and calculate a corresponding oil-water two-phase relative permeability curve of the rock sample at different water injection amounts, where the oil-water two-phase relative permeability curve is the formation parameters in the waterflooding oil reservoir.

According to specific examples provided by the present disclosure, the present disclosure has the following technical effects:

The present disclosure provides a method and system for predicting a time-varying principle of waterflooding oil reservoir formation parameters. Firstly, a measured $T_2$ spectrum-pore size relation model is built according to a measured pore size distribution curve and a measured $T_2$ spectrum. A $T_2$ spectrum of a rock sample at different water injection amounts during a waterflooding physical simulation experiment is acquired. The acquired $T_2$ spectrum at different water injection amounts is then converted into a pore size distribution at different water injection amounts, and a pore network model at different water injection amounts is built with the pore size distribution. Oil-water two-phase flow simulation is performed, and a corresponding oil-water two-phase relative permeability curve of the rock sample at different water injection amounts is obtained eventually. The oil-water two-phase relative permeability curve is the formation parameters in the waterflooding oil reservoir. Thus, the problem of being difficult to simultaneously measure a permeability changing principle and a relative permeability curve changing principle of a given rock sample in the prior art is effectively solved, and therefore, a time-varying principle of formation parameters can be predicted accurately.

BRIEF DESCRIPTION OF THE DRAWINGS

To describe the technical solutions in the examples of the present disclosure or in the prior art more clearly, the accompanying drawings required for the examples will be introduced briefly below. Apparently, the accompanying drawings in the following description show merely some examples of the present disclosure, and those of ordinary skill in the art may still derive other accompanying drawings from these accompanying drawings without creative efforts.

DETAILED DESCRIPTION OF THE EMBODIMENTS

Figure 1:
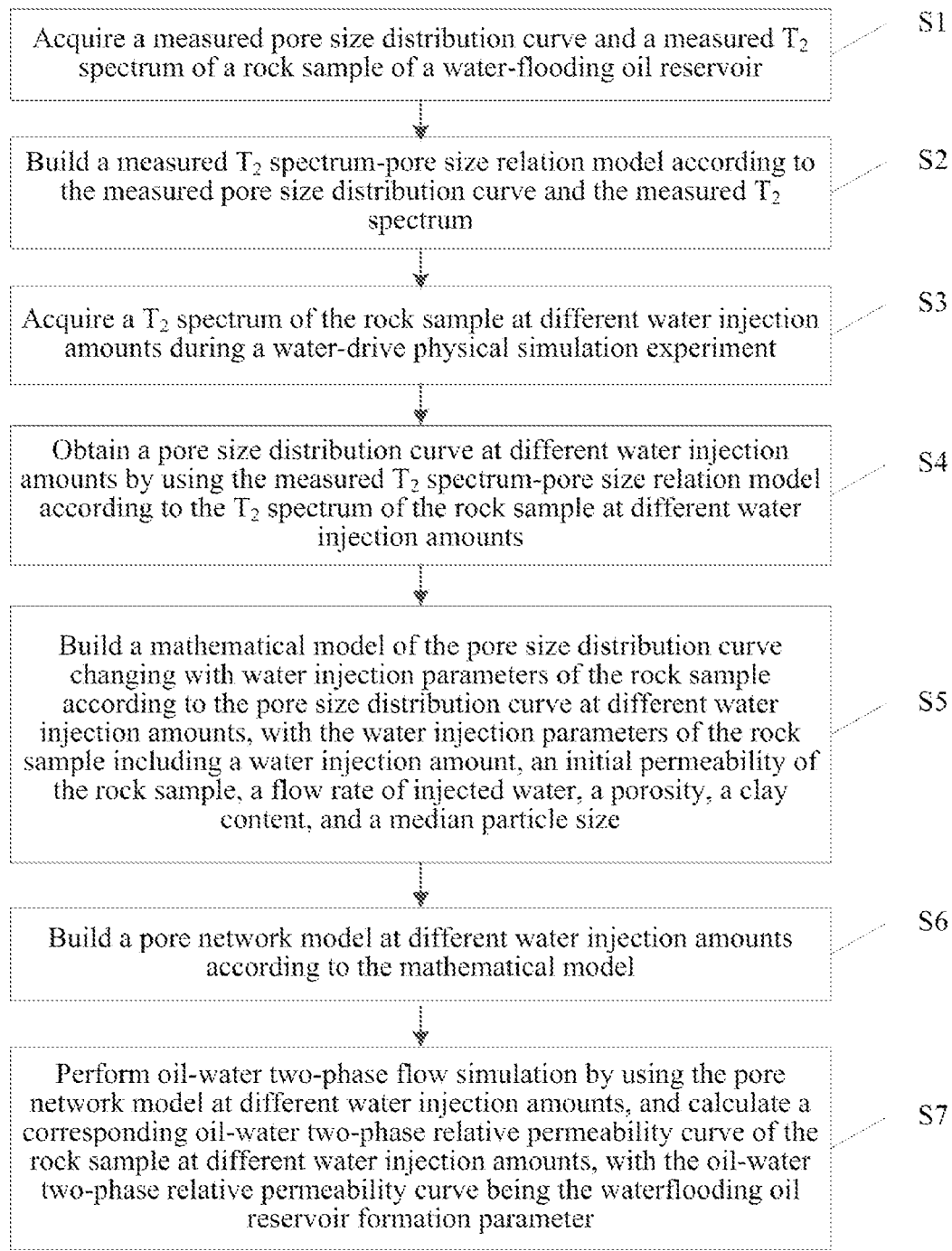
FIG. 1 is a flowchart of a method for predicting a time-varying principle of waterflooding oil reservoir formation parameters according to Example 1 of the present disclosure.

The technical solutions of the examples of the present disclosure are clearly and completely described below with reference to the accompanying drawings. Apparently, the described examples are merely a part rather than all of the examples of the present disclosure. All other examples derived from the examples of the present disclosure by a person of ordinary skill in the art without creative efforts shall fall within the protection scope of the present disclosure.

During a long-term waterflooding process, a pore structure of a reservoir changes gradually, causing an absolute permeability, an oil-water two-phase relative permeability curve and the like of the reservoir to change correspondingly. Such parameters lay a foundation for the design of an oil reservoir development and adjustment scheme and also are preconditions of the numerical simulation of an oil reservoir and the application of various oil reservoir engineering methods. Accordingly, the accurate prediction of a changing principle of formation parameters with time is of great significance for the dynamic prediction and production optimization of oil reservoir development.

By a method for determining a formation permeability changing principle of a waterflooding oil reservoir in the prior art, a changing principle of a reservoir permeability with time is obtained based on indoor test results. However, a changing principle of an oil-water two-phase relative permeability curve of the reservoir with time cannot be obtained. There is also a method for correcting an oil-water relative permeability curve by considering time-varying characteristics of the permeability in the prior art. According to the method, with indoor test means, oil-water relative permeabilities at different water saturations with the consideration of the time-varying characteristics of the permeability are obtained by creating curves such as a relation curve of a permeability correction factor and a water injection multiple, and a relation curve of a water injection multiple and a water saturation, whereby the relative permeability curve is corrected. However, in this method, different testing methods and devices are used to test a core permeability and the relative permeability curve. When creating the relation curve of a permeability correction factor and a water injection multiple, the relation curve is measured under a single-phase water flow condition. The relative permeability curve is measured under an oil-water two-phase flow condition. The direct association of the two curves may result in an inaccurate prediction result.

The present disclosure has the following advantages: a relation model between a relaxation time $T_2$ spectrum and a pore size is built by a high pressure mercury intrusion method and a nuclear magnetic resonance method. A waterflooding physical simulation experiment is conducted, during which a permeability change is calculated from a pressure difference between two ends of a rock sample, and a $T_2$ spectrum at different pore volume (PV) multiples of injected water is obtained by nuclear magnetic resonance. A pore size distribution at different PV multiples of injected water is obtained by means of the relation model between a relaxation time $T_2$ spectrum and a pore size. A mathematical model of a pore size distribution changing with a PV multiple of injected water, an initial permeability of the rock sample, an average water injection rate, an initial porosity, a clay type, an initial clay content, and a median particle size is built. A pore network model at different PV multiples of injected water is built by using the mathematical model and corrected by using a permeability changing principle measured by experiments. Oil-water two-phase flow simulation is performed by using the corrected pore network model at different PV multiples of injected water to obtain a corresponding oil-water two-phase relative permeability curve of the rock sample at different PV multiples of injected water. This method solves the problem of being difficult to simultaneously measure a permeability changing principle and a relative permeability curve changing principle of a given rock sample in practice and provides a new method for accurately predicting a time-varying principle of formation parameters.

An objective of the present disclosure is to provide a method and system for predicting a time-varying principle of waterflooding oil reservoir formation parameters. A $T_2$ spectrum at different water injection amounts is converted into a pore size distribution, and a pore network model at different water injection amounts is built with the pore size distribution. Oil-water two-phase flow simulation is then performed, and a corresponding oil-water two-phase relative permeability curve of a rock sample at different water injection amounts is obtained eventually. The problem of being difficult to simultaneously measure a permeability changing principle and a relative permeability curve changing principle of a given rock sample in the prior art is effectively solved, and therefore, a time-varying principle of formation parameters can be predicted accurately.

The present disclosure provides a method and system for predicting a time-varying principle of waterflooding oil reservoir formation parameters. The method includes the following steps: build a relation model of a transverse relaxation time $T_2$ spectrum and a pore size by a high pressure mercury intrusion method and a nuclear magnetic resonance method; conduct a waterflooding physical simulation experiment, calculate a permeability change of a rock sample from a pressure difference between two ends of the rock sample, and obtain a $T_2$ spectrum at different PV multiples of injected water by nuclear magnetic resonance; obtain a pore size distribution at different PV multiples of injected water from the $T_2$ spectrum at different PV multiples of injected water by means of the relation model of a transverse relaxation time $T_2$ spectrum and a pore size; analyze the pore size distribution at different PV multiples of injected water, and build a mathematical model of a pore size distribution changing with a PV multiple of injected water, an initial permeability of the rock sample, an injected water flow rate, a porosity, a clay content, and a median particle size; build a pore network model at different PV multiples of injected water by using the mathematical model, and correct the pore network model using a permeability changing principle measured by experiments; and perform oil-water two-phase flow simulation by using the corrected pore network model at different PV multiples of injected water to obtain a corresponding oil-water two-phase relative permeability curve of the rock sample at different PV multiples of injected water. The present disclosure provides a method capable of simultaneously measuring a permeability changing principle and a relative permeability curve changing principle of a rock sample.

To make the above objectives, features, and advantages of the present disclosure clearer and more comprehensible, the present disclosure will be further described in detail below with reference to the accompanying drawings and the specific examples.

Example 1

As shown in FIG. 1, this example provides a method for predicting a time-varying principle of waterflooding oil reservoir formation parameters, including the following steps.

S1, a measured pore size distribution curve and a measured $T_2$ spectrum of a rock sample of a waterflooding oil reservoir is acquired.

In this example, the rock sample is obtained from a reservoir formation. The rock sample is sandstone, and oil is distributed in pores of the sandstone. For a rock core sample within a target area, a measured pore size distribution curve of the rock sample is acquired by a high pressure mercury intrusion method. A measured $T_2$ spectrum of the rock sample is acquired by a nuclear magnetic resonance method. A certain block of Daqing oilfield is selected as the target area in this example.

The rock sample used in this example is an arbitrary standard rock core. A mercury injection pressure curve of the rock core is measured by high pressure mercury intrusion experiments, and a pore size distribution corresponding to different pressures is then obtained by using Washburn equation, thereby obtaining the measured pore size distribution curve. By nuclear magnetic resonance experiments, measurement parameters for a transverse relaxation time $T_2$ of nuclear magnetic resonance of the given rock sample are set, including an echo spacing, a complete recovery time, a count of echoes, a count of scans, and an acceptance benefit. After the measurement of the transverse relaxation time $T_2$ by a Carr-Purcell-Meiboom-Gill (CPMG) pulse sequence, a transverse relaxation time $T_2$ distribution is calculated to obtain the measured $T_2$ spectrum.

S2, a measured $T_2$ spectrum-pore size relation model is built according to the measured pore size distribution curve and the measured $T_2$ spectrum.

This step specifically includes the following steps:

set a conversion coefficient C;

calculate a pore size distribution curve by using a $T_2$ spectrum-pore size relation model according to the measured $T_2$ spectrum and the conversion coefficient C, where the $T_2$ spectrum-pore size relation model is $r=CT_2$, where C represents the conversion coefficient; r represents a pore radius; and $T_2$ represents a transverse relaxation time;

determine whether first peak values of the pore size distribution curve and the measured pore size distribution curve coincide; if not, adjust a value of the conversion coefficient C, and return to the step "calculate a pore size distribution curve by using a $T_2$ spectrum-pore size relation model according to the measured $T_2$ spectrum and the conversion coefficient C" until the first peak values of the pore size distribution curve and the measured pore size distribution curve coincide, thereby obtaining the measured $T_2$ spectrum-pore size relation model. When updating the conversion coefficient, the calculated pore size distribution curve is compared with the measured pore size distribution curve. If the first peak value of the calculated pore size distribution curve is found to be located on the right side of the first peak value of the measured pore size distribution curve, the conversion coefficient C is reduced until the two peak values coincide.

S3, a $T_2$ spectrum of the rock sample at different water injection amounts during a waterflooding physical simulation experiment is acquired. Meanwhile, an actual permeability of the rock sample at different water injection amounts during the waterflooding physical simulation experiment is also acquired in this example. "Different water injection amounts" in this example refer to a certain accumulated water injection amount corresponding to a certain moment. However, the accumulated water injection amount is an absolute value, which is different for rock cores of different sizes. Therefore, other terms such as "different pore volumes of injected water" or "different surface fluxes" may be frequently used in this art to express this meaning. These terms have different meanings, but can be converted into one another, which will not be limited herein.

In this example, "different water injection amounts" refer to "different PV multiples of injected water". Different PV multiples of injected water refer to different pore volume multiples of injected water. Pore volume is usually abbreviated as PV in industry.

A waterflooding experiment is conducted. A permeability change of the rock sample is calculated from a pressure field at two ends of the rock sample, and a $T_2$ spectrum at different PV multiples of injected water is obtained by a nuclear magnetic resonance test. In this example, a PV multiple is a multiple of the pore volume, and a PV multiple of injected water means that an amount of injected water is a multiple of the pore volume. For the convenience of subsequent expression, the PV multiples of injected water are used in the expression of specific implementations to represent different water injection amounts.

In this example, a rock core is prepared firstly, and a porosity of the rock core and an initial water permeability are measured. Water is injected continuously; pressure fields at two ends of the rock sample and flow rates through the rock sample at different PV multiples of injected water are recorded, and permeability changes at different PV multiples of injected water are calculated by Darcy equation; and a $T_2$ spectrum at different PV multiples of injected water is obtained by a nuclear magnetic resonance test.

S4, a pore size distribution curve at different water injection amounts is obtained by using the measured $T_2$ spectrum-pore size relation model according to the $T_2$ spectrum of the rock sample at different water injection amounts.

By using the above-mentioned measured $T_2$ spectrum-pore size relation model, the nuclear magnetic resonance $T_2$ spectrum of the test rock sample at different PV multiples of injected water is converted into a pore size distribution, thereby obtaining a pore size distribution curve at different PV multiples of injected water.

S5, a mathematical model of the pore size distribution curve changing with water injection parameters of the rock sample according to the pore size distribution curve at different water injection amounts, where the water injection parameters of the rock sample include a water injection amount, an initial permeability of the rock sample, an average water injection rate, an initial porosity, a clay type, an initial clay content, and a median particle size. Specific steps are as follows.

S51, the pore size distribution curve at different water injection amounts is taken as a superposition of a number of normal distribution functions, where the number of the normal distribution functions should be the same as the number of peak values on the pore size distribution curve. If there is only one peak value, one normal distribution function is used for description. If there are two peak values, two normal distribution functions are used for description.

S52, a mathematical expectation and a standard deviation of each normal distribution function are calculated by using an EM algorithm. The full name of the EM algorithm is expectation-maximization algorithm.

In this example, the pore size distribution curve at different PV multiples of injected water is taken as a superposition of n normal distribution functions, where n is the number of peak values on the pore size distribution curve. For the pore size distribution curve at a given PV multiple, the mathematical expectations and the standard deviations corresponding to these normal distribution functions are calculated by the EM algorithm to be $\mu_{g1}$, $\sigma_{g1}$, $\mu_{g2}$, $\sigma_{g2}$, . . . , $\mu_{gn}$, $\sigma_{gn}$, respectively, with g being the PV multiple of injected water.

S53, a functional relationship of the mathematical expectation and the standard deviation of the normal distribution function with the water injection parameters of the rock sample is built, thereby obtaining the mathematical model of the pore size distribution curve changing with the water injection parameters of the rock sample.

A functional relationship of the mathematical expectation of each normal distribution function with a PV multiple of injected water, an initial permeability of the rock sample, an initial porosity, a mean flow rate of injected water, an initial clay content, and a median particle size is built. The pore size distribution curve at different PV multiples of injected water conforms to the superposition of n normal distribution functions. That is, the pore size distribution curve at different PV multiples of injected water is taken as the superposition of n normal distribution functions, and the mathematical expectation mentioned here is a calculated implicit parameter variable. In practical application, for a certain rock core, if such parameters as PV multiple of injected water, initial permeability, initial porosity, mean flow rate of injected water, porosity, initial clay content, and median particle size are given, the mathematical expectations and the standard deviations of n normal distribution functions corresponding to a certain PV multiple can be calculated by using the functional relationship, and then the corresponding pore size distribution curve is obtained by accumulation using the following equation.

A functional relationship of the standard deviation of each normal distribution function with a PV multiple of injected water, an initial permeability of the rock sample, an average water injection rate, an initial porosity, a clay type, an initial clay content, and a median particle size is built. The standard deviation mentioned here is also a calculated implicit parameter variable.

The methods for building the functional relationships of the mathematical expectation and the standard deviation with different parameters include but are not limited to multivariate linear regression, XGBoost, support vector machine, random forest, or the like.

Thus, the pore size distribution function at different PV multiples of injected water may be obtained by the following equation:

$$f(x) = \sum_{i=1}^{n} \frac{1}{\sqrt{2\pi} \sigma_{gi}} \exp\left(-\frac{(x-\mu_{gi})^2}{2\sigma_{gi}^2}\right)$$

where $\sigma_{gi}$ represents a respective standard deviation of the pore size distribution curve at different PV multiples of injected water; $\mu_{gi}$ represents a respective mathematical expectation of the pore size distribution curve at different PV multiples of injected water; n represents the number of normal distributions at any PV multiple of injected water; exp represents an exponential function with natural constant e as the base; and x is an arbitrary real number.

S6, a pore network model at different water injection amounts is built according to the mathematical model. The pore network model is then corrected with the actual permeability.

The pore network model is built according to the pore size distribution. Single-phase water flow simulation is performed by using the pore network model.

A pressure difference between two ends of the simulated pore network and a flow rate are acquired. A model permeability is calculated by Darcy equation according to the pressure difference and the flow rate.

Whether the model permeability is the same as the actual permeability is determined; if not, physical parameters of the pore network model are adjusted, and the method proceeds back to the step that "single-phase water flow simulation is performed by using the pore network model" until the model permeability is the same as the actual permeability.

The physical parameters of the network model in this example include: a ratio of a pore to a throat size, a coordination number, a pore shape factor, etc. The physical parameters will not be limited herein. When the model permeability and the actual permeability are the same, the pore network model at different PV multiples of injected water is obtained.

S7, oil-water two-phase flow simulation is performed by using the pore network model at different water injection amounts, and a corresponding oil-water two-phase relative permeability curve of the rock sample at different water injection amounts is calculated, where the oil-water two-phase relative permeability curve is the formation parameters in the waterflooding oil reservoir.

In this example, with the pore network model at different PV multiples of injected water, a pore network simulation method is used, and an appropriate displacement velocity or displacement pressure difference is selected to perform oil-water two-phase flow simulation according to the requirements of displacement conditions. During the simulation of the pore network, the pore network is fully saturated with water in an initial state. Subsequently, oil driving water simulation is performed firstly to create connate water, and then water driving oil simulation is performed to obtain the oil-water two-phase relative permeability curve. The displacement conditions may be set according to SY/T5345-2007 Test method for two phase relative permeability in rock, and the appropriate displacement velocity or displacement pressure difference is calculated by a constant velocity method or a constant pressure method.

The flow rates of the oil and water phases in the pore network model and the pressure difference between the two ends of the model are recorded accurately, and an effective permeability of each phase is calculated when the oil and water phases coexist. With the oil-water two-phase flow simulation, when a water cut reaches 99.95% or after the water injection amount reaches 30 PVs, an effective permeability of the water phase in residual oil is measured. The relative permeability of the oil phase and the water phase at a corresponding water saturation is calculated, thereby obtaining the corresponding oil-water two-phase relative permeability curve of the rock sample at different PV multiples.

In an optional implementation, in this example, oil-water two-phase flow simulation is performed, a pore network model of oil-drive fully saturated water is used until no water comes out of the pore network model, and an effective permeability of oil phase in a connate water state $k_o(s_{wc})$ is established:

$$k_o(s_{wc}) = \frac{\mu_o q_o L}{A \Delta p},$$

where $\mu_o$ represents a viscosity of an oil phase; $q_o$ represents a flow rate of the oil phase passing through the pore network model; L represents a length of the pore network model; A represents a sectional area of the pore network model; and $\Delta P$ represents a pressure difference between an inlet and an outlet of the pore network model.

Water driving oil simulation is performed; flow rates of oil and water phases in the pore network model and a pressure difference between two ends of the pore network model are obtained, and an effective permeability of each phase when the oil and water phases coexist is calculated by the following formulas:

$$k_o = \frac{\mu_o q_o L}{A \Delta p}, \text{ and } k_w = \frac{\mu_w q_w L}{A \Delta p},$$

where $k_o$ and $k_w$ represent effective permeabilities of the oil and water phases, respectively; $\mu_w$ represents a viscosity of the water phase; and $q_w$ represents a flow rate of the water phase passing through the pore network model.

When a water cut reaches 99.95% or after the water injection amount reaches 30 times PV (this standard is a preferred value, which will not be limited herein), an effective permeability of the water phase in a residual oil state is calculated by the following equation:

$$k_w(s_{or}) = \frac{\mu_w q_w L}{A \Delta p},$$

where $k_w(s_{or})$ represents the effective permeability of the water phase in the residual oil state.

This example provides a method for predicting a time-varying principle of waterflooding oil reservoir formation parameters. Firstly, a $T_2$ spectrum-pore size relation model is built according to a measured pore size distribution curve and a measured $T_2$ spectrum. $T_2$ spectra of a rock sample at different water injection amounts during a waterflooding physical simulation experiment are acquired. The acquired $T_2$ spectra at different water injection amounts are then converted into pore size distributions at different water injection amounts, and a pore network model at different water injection amounts is built with the pore size distribution. Oil-water two-phase flow simulation is performed, and a corresponding oil-water two-phase relative permeability curve of the rock sample at different PV multiples is obtained eventually. The oil-water two-phase relative permeability curve is the formation parameters in the waterflooding oil reservoir. Thus, the problem of being difficult to simultaneously measure a permeability changing principle and a relative permeability curve changing principle of a given rock sample in the prior art is effectively solved, and therefore, a time-varying principle of formation parameters can be predicted accurately.

Example 2

Figure 2:
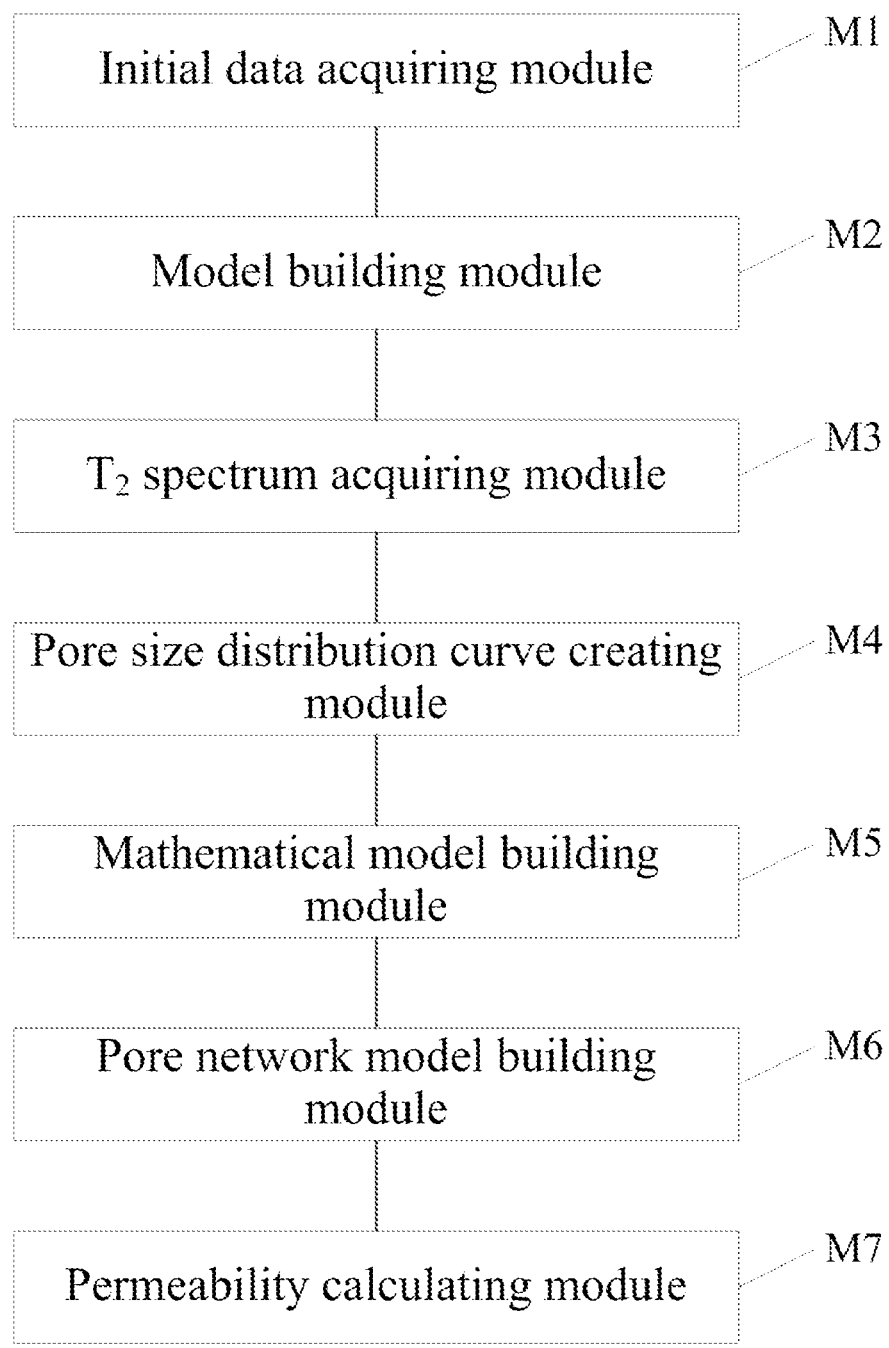
FIG. 2 is a block diagram of a system for predicting a time-varying principle of waterflooding oil reservoir formation parameters according to Example 2 of the present disclosure.

As shown in FIG. 2, this example provides a system for predicting a time-varying principle of waterflooding oil reservoir formation parameters, including:

an initial data acquiring module M1 configured to acquire a measured pore size distribution curve and a measured $T_2$ spectrum of a rock sample of a waterflooding oil reservoir;

a model building module M2 configured to build a measured $T_2$ spectrum-pore size relation model according to the measured pore size distribution curve and the measured $T_2$ spectrum;

a $T_2$ spectrum acquiring module M3 configured to acquire a $T_2$ spectrum of the rock sample at different water injection amounts during a waterflooding physical simulation experiment;

a pore size distribution curve creating module M4 configured to obtain a pore size distribution curve at different water injection amounts by using the measured $T_2$ spectrum-pore size relation model according to the $T_2$ spectrum of the rock sample at different water injection amounts;

a mathematical model building module M5 configured to build a mathematical model of the pore size distribution curve changing with water injection parameters of the rock sample according to the pore size distribution curve at different water injection amounts, where the water injection parameters of the rock sample include a water injection amount, an initial permeability of the rock sample, an average water injection rate, an initial porosity, a clay type, an initial clay content, and a median particle size;

a pore network model building module M6 configured to build a pore network model at different water injection amounts according to the mathematical model;

a permeability calculating module M7 configured to perform oil-water two-phase flow simulation by using the pore network model at different water injection amounts, and calculate a corresponding oil-water two-phase relative permeability curve of the rock sample at different water injection amounts, where the oil-water two-phase relative permeability curve is formation parameters in the waterflooding oil reservoir.

Example 3

Figure 3:
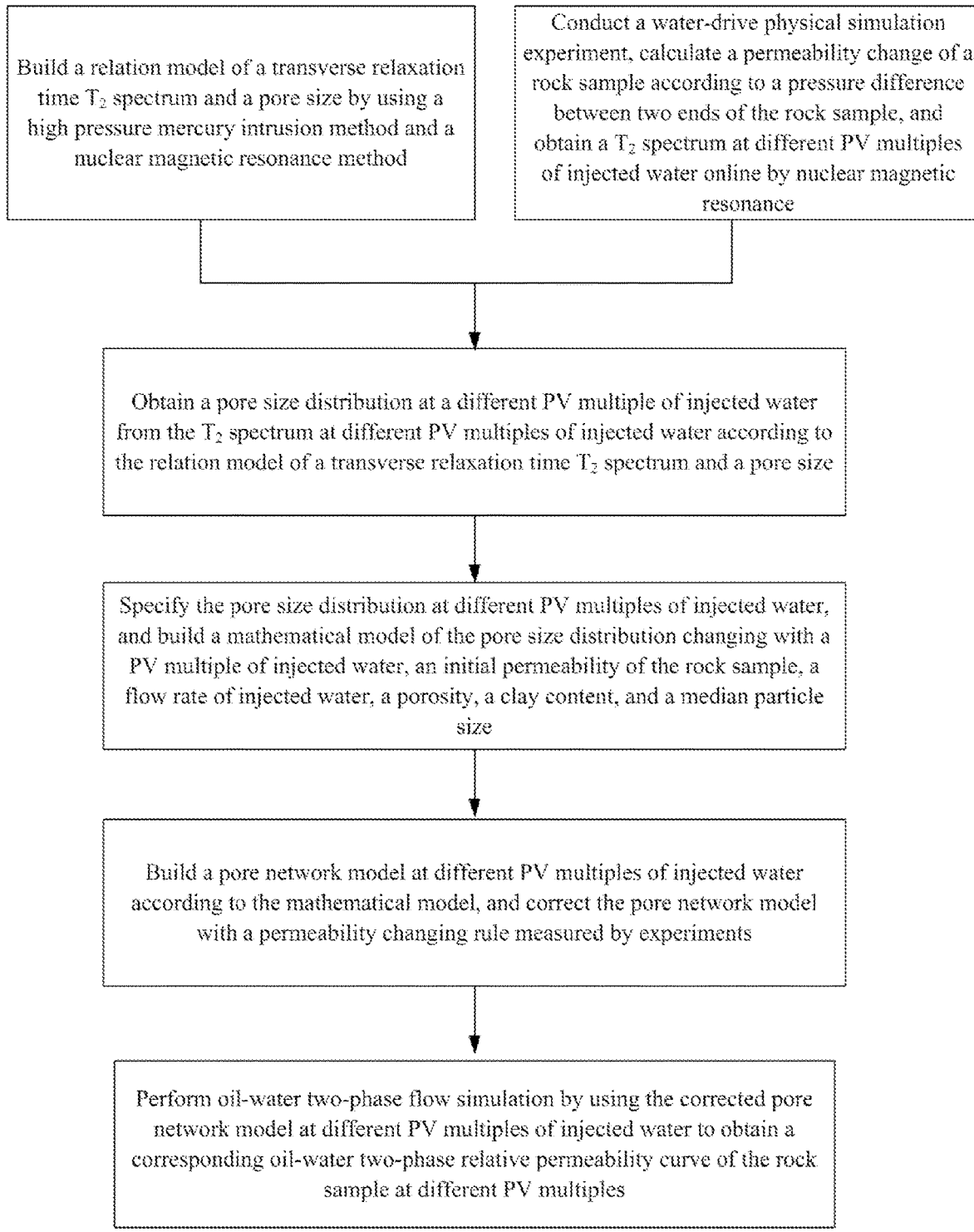
FIG. 3 is a flowchart of a method for predicting a time-varying principle of waterflooding oil reservoir formation parameters according to Example 3 of the present disclosure.

To solve the problem of being difficult to simultaneously measure a permeability changing principle and a relative permeability curve changing principle of a rock sample by an existing method, this example provides a method for predicting a time-varying principle of waterflooding oil reservoir formation parameters. As shown in FIG. 3, the method includes the following steps.

S1: a standard rock sample having a diameter of 2.5 cm and a length of 6 cm is selected; a pore size distribution is tested by a high pressure mercury intrusion method, and a $T_2$ spectrum is tested by a nuclear magnetic resonance method; and a relation model between a relaxation time $T_2$ spectrum and a pore size is built.

Figure 4:
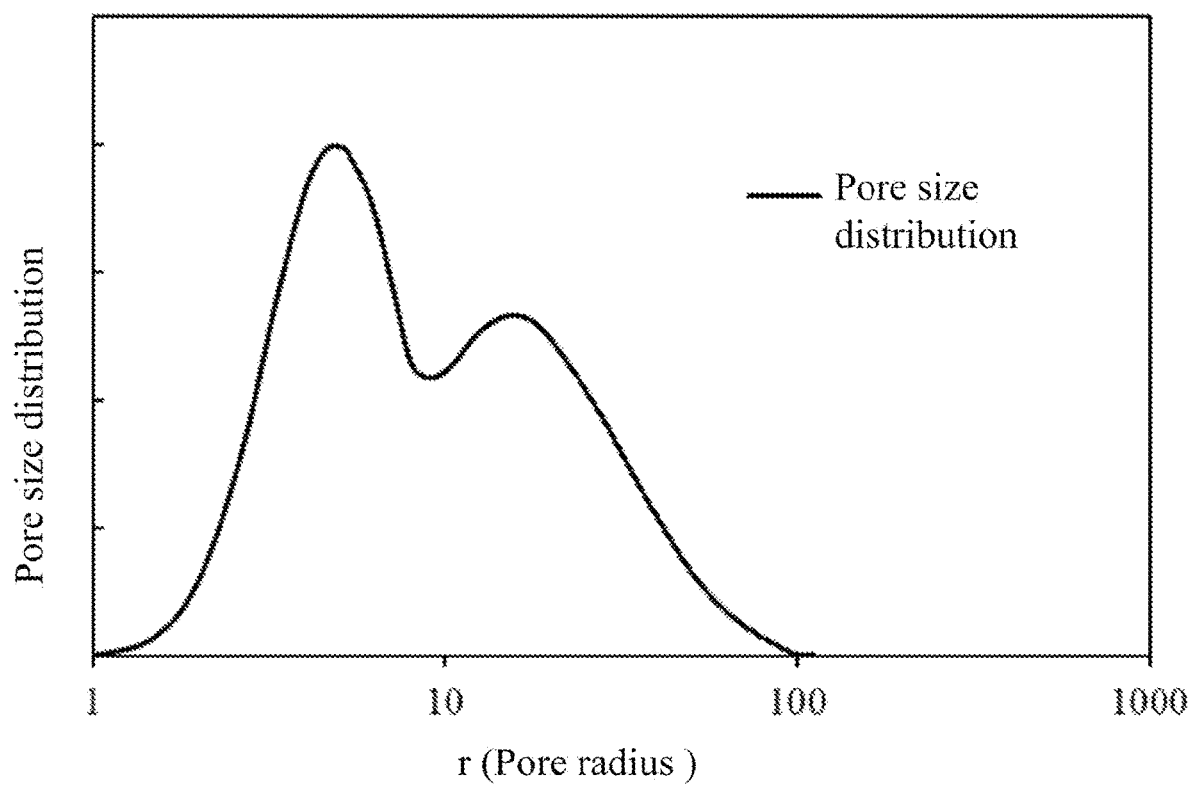
FIG. 4 is a schematic diagram of a pore size distribution of a rock sample according to Example 3 of the present disclosure.

S11: A mercury injection pressure curve of the rock is measured by high pressure mercury intrusion experiments. Pressures are converted into pore sizes by using Washburn equation to obtain a pore size distribution of the rock sample, as shown in FIG. 4.

S12: the rock sample is vacuumized and washed to remove oil, dried to a constant weight $m_0$=46.1 g cooled in a dryer to room temperature 25° C., and then vacuumized with pressurized saturated distilled water.

To prepare for measurement, the rock sample $m_1$=53.5 g fully saturated with water is put into a closed glass container, and the whole closed glass container is preserved in an incubator so that the temperature of the incubator is consistent with a measurement temperature.

Figure 5:
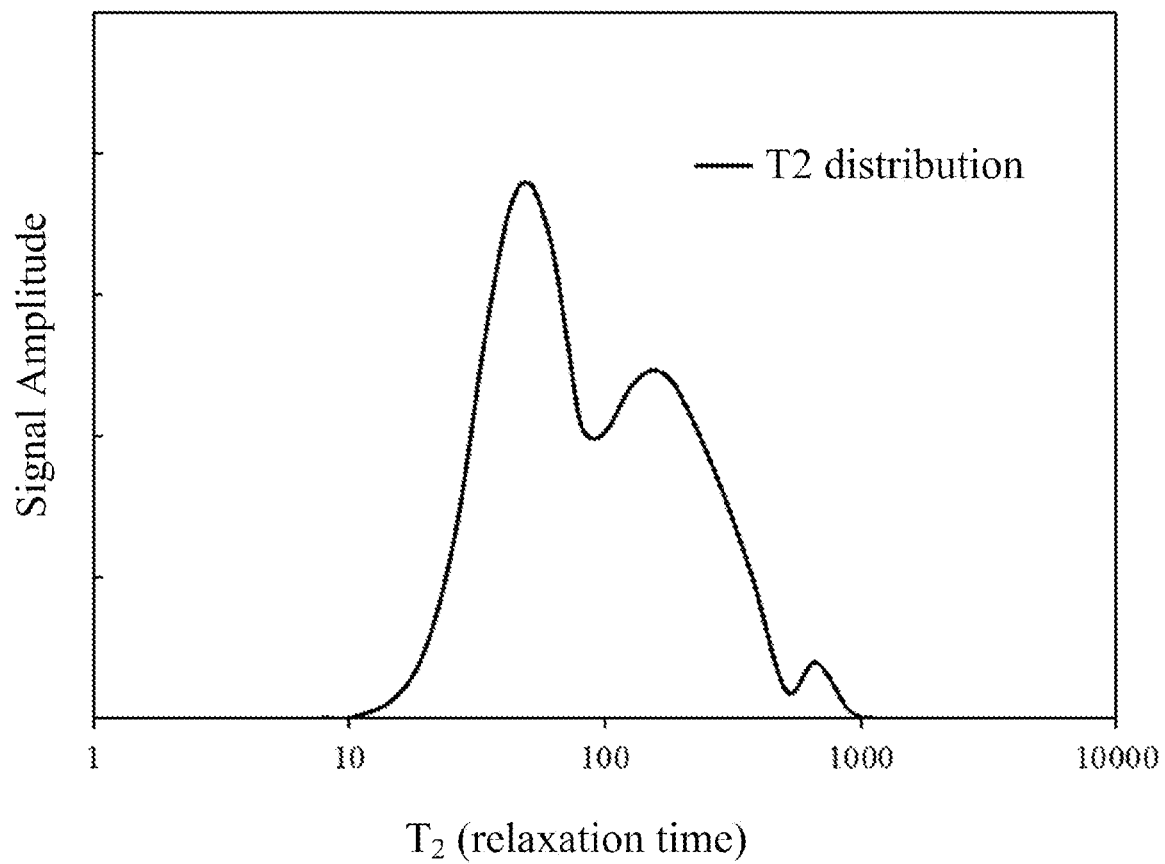
FIG. 5 is a schematic diagram of a $T_2$ spectrum of a relaxation time of a rock sample according to Example 3 of the present disclosure.

By nuclear magnetic resonance experiments, measurement parameters for a transverse relaxation time $T_2$ of nuclear magnetic resonance of the rock sample are set as follows: echo spacing 0.2 ms, complete recovery time 10 s, 4096 echoes, 128 scans, and acceptance benefit 50-100%. After the measurement of the transverse relaxation time $T_2$ by a CPMG pulse sequence, a transverse relaxation time $T_2$ distribution is calculated, as shown in FIG. 5.

S13: a conversion coefficient C is set to 0.1, and the relation model of a relaxation time $T_2$ spectrum and a pore size distribution is used, with the equation being as follows:

$$r=0.1T_2$$

where r represents a pore radius; and $T_2$ represents a transverse relaxation time.

Figure 6:
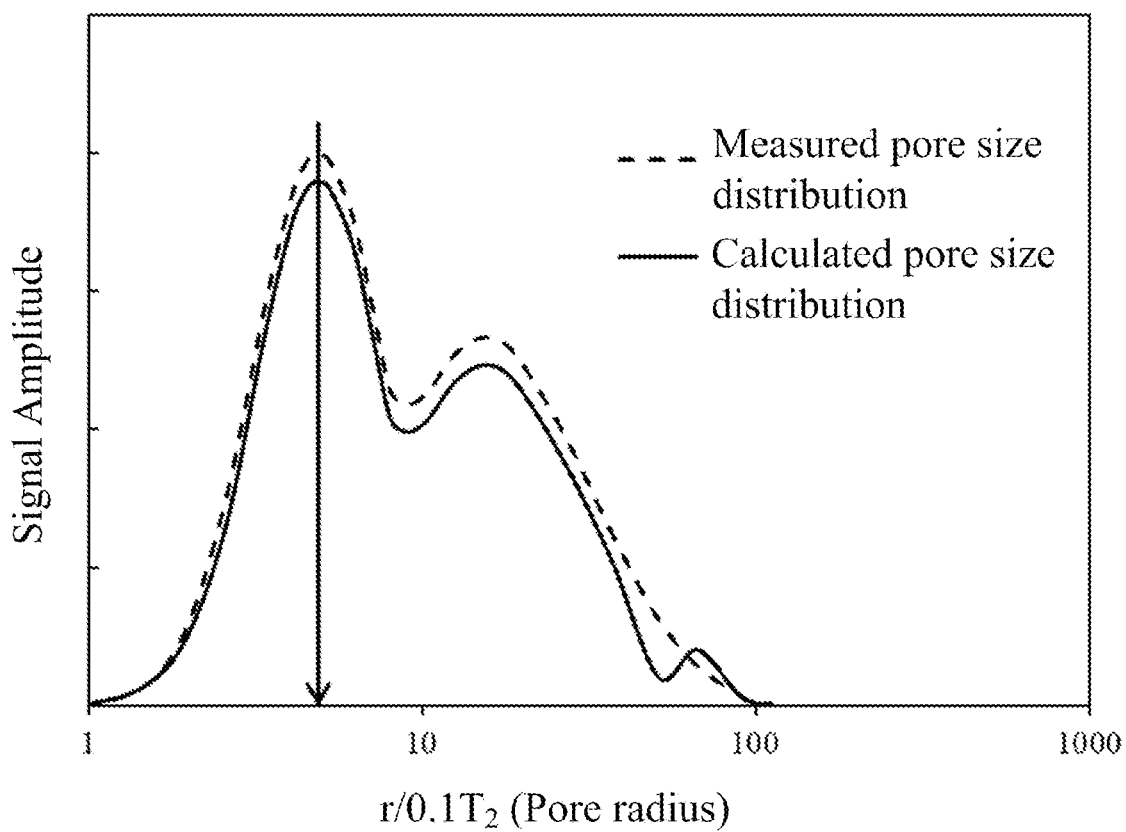
FIG. 6 is a schematic diagram of a calculated pore size distribution and a measured pore size distribution of a rock sample according to Example 3 of the present disclosure.

A pore size distribution is calculated according to the transverse relaxation time $T_2$ spectrum and the conversion coefficient C=0.1. The calculated pore size distribution is compared with the measured pore size distribution curve, and the value of the conversion coefficient C is adjusted so that the first peak values of the calculated pore size distribution and the measured pore size distribution curve coincide, as shown in FIG. 6.

S2: a waterflooding experiment is conducted, a permeability change of the rock sample is calculated from a pressure difference between two ends of the rock sample, and $T_2$ spectra at different PV multiples of injected water are obtained by nuclear magnetic resonance tests.

S21, a rock core is prepared, and a porosity φ=0.251 of the rock core and an initial permeability measured with water $k_0$=1.24 μm² are measured.

Figure 7:
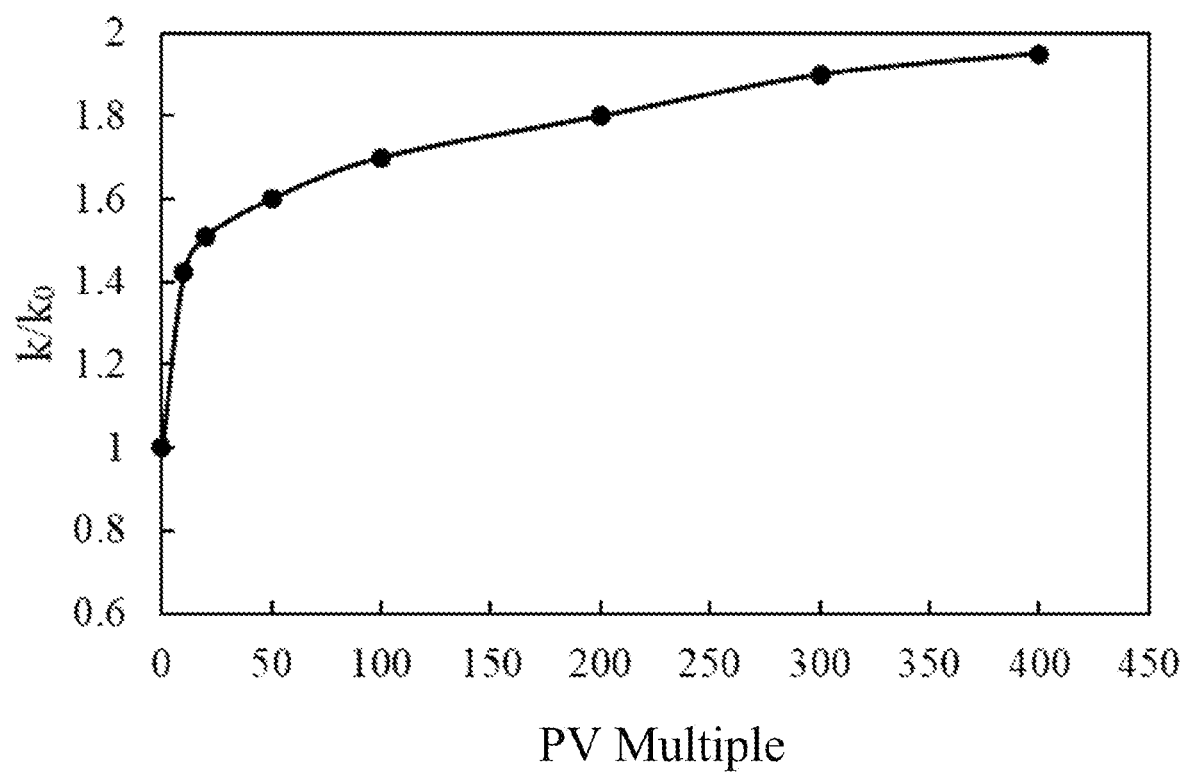
FIG. 7 is a schematic diagram of different PV multiples of injected water and permeability changes of a rock sample according to Example 3 of the present disclosure.

Water is injected continuously, pressure differences between two ends of the rock sample and flow rates through the rock sample at different PV multiples of injected water are recorded, and permeability changes at different PV multiples of injected water are calculated by Darcy equation, as shown in FIG. 7.

A $T_2$ spectrum at different PV multiples of injected water is obtained by a nuclear magnetic resonance test.

S3: a pore size distribution at different PV multiples of injected water is obtained from the $T_2$ spectrum at different PV multiples of injected water according to the relation model of a relaxation time $T_2$ spectrum and a pore size distribution.

S31: the following equation is constructed according to the relation model of a relaxation time $T_2$ spectrum and a pore size distribution:

$$r=CT_2$$

where r represents a pore radius; and $T_2$ represents a transverse relaxation time.

The nuclear magnetic resonance $T_2$ spectrum of the test rock sample at different PV multiples of injected water is converted into a pore size distribution, thereby obtaining a pore size distribution curve at different PV multiples of injected water.

S4: a mathematical model of the pore size distribution changing with a PV multiple of injected water, an initial permeability of the rock sample, an average water injection rate, an initial porosity, a clay content, and a median particle size is built according to the pore size distribution at different PV multiples of injected water.

S41: since the pore size distribution curves at 0 PV and 10 PVs of injected water each have two peak values, this can be taken as the superposition of 2 normal distribution functions.

The mathematical expectation and the standard deviation of each normal distribution function are modified continuously by the EM algorithm, and this process is repeated till convergence. Each iteration of the EM algorithm includes two steps, namely E step and M step.

E step: a weight value $w_{ik}$ of each of all pore size distribution data point is calculated by the following formula:

$$w_{ik} = \frac{p_k(x_i|\mu_k, \Sigma_k)\alpha_k}{\sum_{m=1}^{K} p_m(x_i|\mu_m, \Sigma_m)\alpha_m}$$

where K represents the total number of categories (the pore size distribution curve at 0 PV and 10 PVs is calculated in this example, which is taken as the superposition of 2 normal distribution functions, and therefore, the number of categories is 2 here); N represents the number of data points; $\alpha_k$ represents a prior probability of category k (the prior probability is a randomly given initial value, which can be arbitrary); $x_i$ represents a data point of normal distribution functions of category k; $\mu_m$, $\Sigma_m$ represent a mean and a variance of normal distribution functions of category m, respectively; $\alpha_m$ represents a prior probability of category m; represent a mean and a variance of normal distribution functions of category k, respectively; and $p_m(x_i|\theta_m)$ represents a normal distribution function of category m.

$p_k(x_i|\mu k, \Sigma_k)$ is calculated by the following formula:

$$p_k(x_i|\mu_k, \Sigma_k) = (2\pi)^{-\frac{1}{2}}|\Sigma_k|^{-\frac{1}{2}}\exp\left(-\frac{1}{2}(x_i-\mu_k)^2\Sigma_k^{-1}\right)$$

where $p_k(x_i|\theta_k)$ represents the kth normal distribution function.

M step: new parameter values are calculated with the weight value $w_{ik}$ and corresponding pore size distribution data. The parameter values may be updated by the following formulas:

$$\alpha_k^{new} = \frac{N_k}{N}$$

$$\mu_k^{new} = \left(\frac{1}{N_k}\right)\sum_{i=1}^{N} w_{ik}x_i$$

$$\Sigma_k^{new} = \left(\frac{1}{N_k}\right)\sum_{i=1}^{N} w_{ik}(x_i-\mu_k^{new})(x_i-\mu_k^{new})^T$$

where $\alpha_k^{new}$ represents an updated prior probability of category k; $N_k$ represents a weight sum of pore size distribution data of category k; $\mu_k^{new}$ represents an updated mean of the normal distribution function of category k; and $\Sigma_k^{new}$ represents an updated variance of the normal distribution function of category k.

For the pore size distribution curve at 0 PV and 10 PVs of injected water, parameters corresponding to the normal distribution functions at 0 PV of injected water are obtained by the EM algorithm as follows: $\mu_{01}=1.10$, $\sigma_{01}=0.20$, $\mu_{02}=1.50$, and $\sigma_{02}=0.30$ where $\mu_{01}$ represents a mathematical expectation of the first normal distribution function at 0 PV of injected water; $\mu_{02}$ represents a mathematical expectation of the second normal distribution function at 0 PV of injected water; $\sigma_{01}$ represents a standard deviation of the first normal distribution function at 0 PV of injected water; and $\sigma_{02}$ represents a standard deviation of the second normal distribution function at 0 PV of injected water.

A PV multiple of injected water represents how many times of a pore volume a water injection amount to a standard rock core is. A pore size distribution curve may be obtained at each volume multiple of injected water. The pore size distribution curve may have a single peak or multiple peaks. How many normal distribution functions are needed for fitting is determined according to the number of peak values. In case of two peak values, two normal distribution functions are used for fitting; in case of three peak values, three normal distribution functions are used for fitting.

Parameters corresponding to the normal distribution functions at 10 PVs of injected water are $\mu_{101}=1.40$, $\sigma_{101}=0.22$, $\mu_{102}=1.87$, and $\sigma_{102}=0.33$, respectively.

where $\mu_{101}$ represents a mathematical expectation of the first normal distribution function at 10 PVs of injected water; $\mu_{102}$ represents a mathematical expectation of the second normal distribution function at 10 PVs of injected water; $\sigma_{101}$ represents a standard deviation of the first normal distribution function at 10 PVs of injected water; and $\sigma_{102}$ represents a standard deviation of the second normal distribution function at 10 PVs of injected water.

A functional relationship of the mathematical expectation of each normal distribution function with a PV multiple of injected water, an initial permeability of the rock sample, an average water injection rate, an initial porosity, a clay content, and a median particle size is built as follows:

$$\mu_i=aPV+bk_0+cv+d\phi+eV_{sh}+fMD$$

where i is a positive integer, representing the ith normal distribution function; a, b, c, d, e, and f are arbitrary constants; PV represents a pore volume multiple of injected water; $k_0$ represents an initial permeability measured with water; v represents an average water injection rate; $\phi$ represents an initial porosity; $V_{sh}$ represents a clay content; and MD represents a median particle size.

A functional relationship of the standard deviation of each normal distribution function with a PV multiple of injected water, an initial permeability of the rock sample, an average water injection rate, an initial porosity, a clay type, an initial clay content, and a median particle size is built as follows:

$$\sigma_i=aPV+bk_0+cv+d\phi+eV_{sh}+fMD$$

where i is a positive integer, representing the ith normal distribution function; a, b, c, d, e, and f are arbitrary constants; PV represents a pore volume multiple of injected water; $k_0$ represents an initial permeability measured with water; v represents an average water injection rate; $\phi$ represents an initial porosity; $V_{sh}$ represents a clay content; and MD represents a median particle size.

The methods for building the functional relationships of the mathematical expectation and the standard deviation with different parameters include but are not limited to multivariate linear regression, XGBoost, support vector machine, random forest, and the like.

Figure 8:
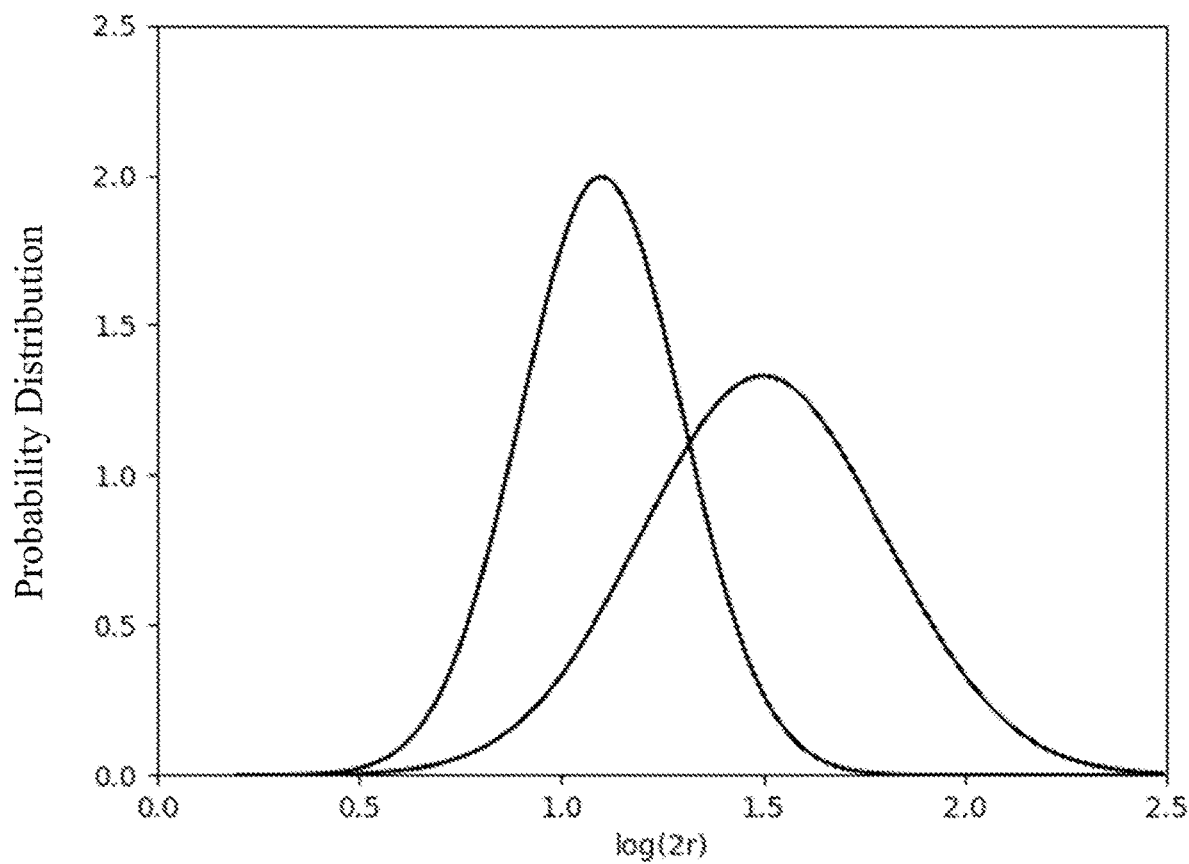
FIG. 8 is a schematic diagram of a pore size distribution function of a rock sample at 0 PV of injected water according to Example 3 of the present disclosure.

Thus, the pore size distribution function at 0 PV of injected water may be obtained, as show in FIG. 8, and the mathematical model is as follows:

$$f(x) = \frac{1}{\sqrt{2\pi}\,\sigma_{01}} \exp\left(-\frac{(x-\mu_{01})^2}{2\sigma_{01}^2}\right) + \frac{1}{\sqrt{2\pi}\,\sigma_{02}} \exp\left(-\frac{(x-\mu_{02})^2}{2\sigma_{02}^2}\right) =$$

$$\frac{1}{\sqrt{2\pi}\times 0.20} \exp\left(-\frac{(x-1.10)^2}{2\times 0.20^2}\right) + \frac{1}{\sqrt{2\pi}\times 0.30} \exp\left(-\frac{(x-1.50)^2}{2\times 0.30^2}\right)$$

Figure 9:
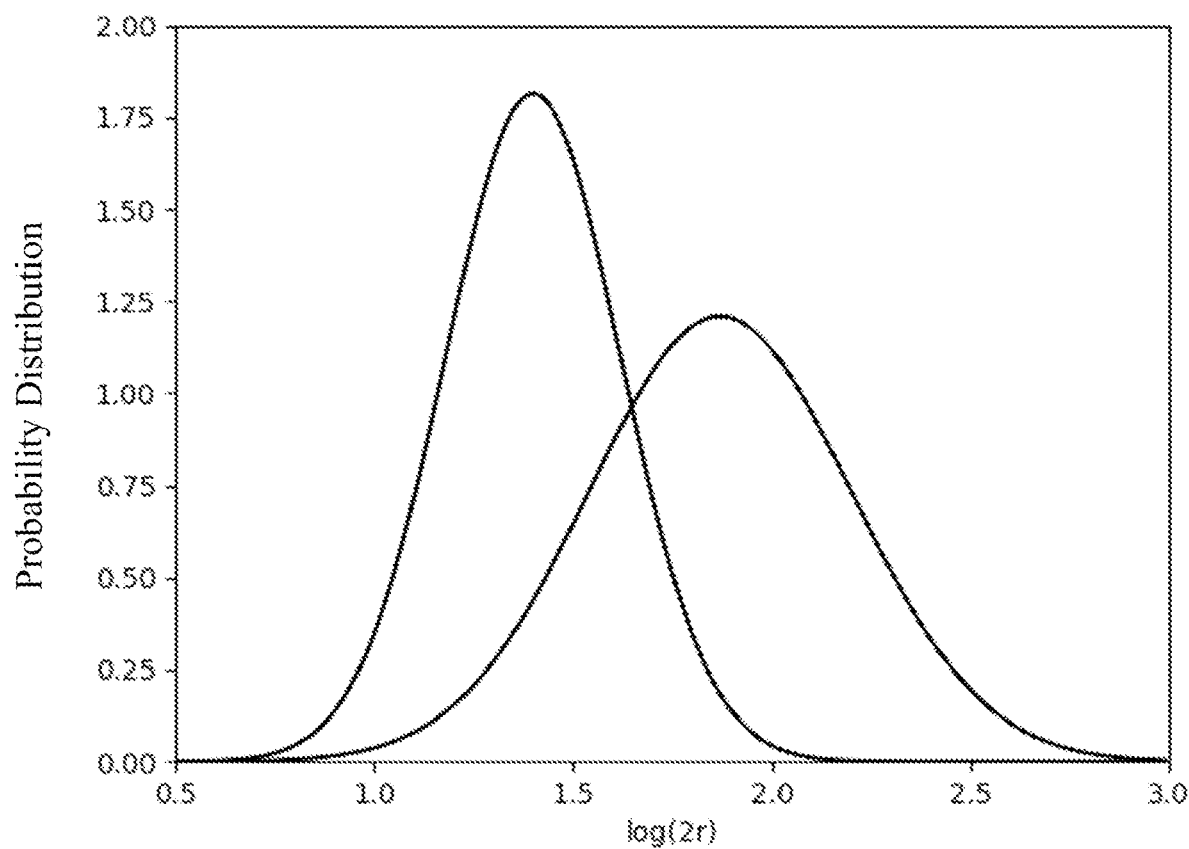
FIG. 9 is a schematic diagram of a pore size distribution function of a rock sample at 10 PVs of injected water according to Example 3 of the present disclosure.

The pore size distribution function at 10 PVs of injected water may be obtained, as show in FIG. 9, and the mathematical model is as follows:

$$f(x) = \frac{1}{\sqrt{2\pi}\,\sigma_{101}} \exp\left(-\frac{(x-\mu_{101})^2}{2\sigma_{101}^2}\right) + \frac{1}{\sqrt{2\pi}\,\sigma_{102}} \exp\left(-\frac{(x-\mu_{102})^2}{2\sigma_{102}^2}\right) =$$

$$\frac{1}{\sqrt{2\pi}\times 0.22} \exp\left(-\frac{(x-1.40)^2}{2\times 0.22^2}\right) + \frac{1}{\sqrt{2\pi}\times 0.33} \exp\left(-\frac{(x-1.87)^2}{2\times 0.33^2}\right)$$

The mathematical expectations and the standard deviations of each normal distribution function at different PV multiples of injected water are calculated by the functional relationship of the mathematical expectation of each normal distribution function with a PV multiple of injected water, an initial permeability of the rock sample, an average water injection rate, an initial porosity, a clay content, and a median particle size, and the functional relationship of the standard deviation of each normal distribution function with a PV multiple of injected water, an initial permeability of the rock sample, an average water injection rate, an initial porosity, a clay type, an initial clay content, and a median particle size. Then mathematical models of pore size distribution functions at different PV multiples of injected water can be obtained (for example, a mathematical model of pore size distribution functions at 3.5 PVs, 6.8 PVs, and 11.6 PVs is calculated from the pore size distribution functions at 0 PV and 10 PVs, thereby providing data for the building of a pore network model at other PV multiples).

S5: pore network models at different PV multiples of injected water are built according to the mathematical models and corrected by using a permeability changing principle measured by experiments.

S51: the pore network models are built using MATLAB three-dimensional imaging according to pore size distributions at different PV multiples of injected water. Related parameters of the pore network model built at 0 PV of injected water are shown in Table 1.

TABLE 1

Related Parameters of Pore Network Model

| Parameter | Value |
|---|---|
| Number of pores | 10 × 10 × 10 |
| Average coordination number | 5 |
| Minimum throat radius | 2 μm |
| Maximum throat radius | 300 μm |
| Pore-to-throat ratio | 2 |
| Porosity | 25.1% |

A pore network of single-phase water is simulated, and an absolute permeability of the model is calculated by Darcy equation according to the pressure difference between the two ends of the pore network model and the flow rate.

The absolute permeability of the model is compared with the absolute permeability measured by an experiment at different PV multiples to determine whether the two are consistent.

If not consistent, the physical parameters of the model such as the ratio of a pore size to a throat size (i.e., pore-to-throat ratio), the coordination number and the pore shape factor are adjusted until the absolute permeability of the model and the absolute permeability measured by the experiment at different PV multiples are consistent. Thus, the pore network model at different PV multiples of injected water is obtained. Specifically, the related parameters of the pore network model in Table 1 are adjusted. By modifying the parameters in Table 1, the predicted permeability of the built pore network model is consistent with the permeability measured by an experiment at different PV multiples.

The mathematical models of pore size distributions at different PV multiples of injected water are already obtained above, and therefore, the pore size distributions at other PV multiples (e.g., at 3.5 PVs, 6.8 PVs, and 11.6 PVs) can be predicted. Thus, the pore network models at 3.5 PVs, 6.8 PVs, and 11.6 PVs can be built. After the correction of step S5, corresponding oil-water relative permeability curves can be predicted. By the method, the permeability and the relative permeability curve at any PV multiple can be predicted.

S6: oil-water two-phase flow simulation is performed by using the pore network model at different PV multiples of injected water to obtain an oil-water two-phase relative permeability curve of the rock sample at different PV multiples of injected water.

S61: oil-water two-phase flow simulation is performed by using the pore network model at different PV multiples of injected water in combination with a quasi-static network simulation method. The pore network model is fully saturated with water in an initial state. In this case, piston-like oil displacing water simulation is performed. An inlet capillary pressure is determined by Young-Laplace equation. For a circular unit, the capillary pressure equation is as follows:

$$R_1 = R_2 = \frac{r}{\cos\theta_r}$$

$$p_c = p_o - p_w = \sigma_{ow}\left(\frac{1}{R_1} + \frac{1}{R_2}\right) = \frac{2\sigma_{ow}\cos\theta_r}{r}$$

where $p_c$ represents a capillary pressure; $p_o$ represents an oil-phase pressure; $p_w$ represents a water-phase pressure; $\sigma_{ow}$ represents an interfacial tension between oil and water; $R_1$ and $R_2$ are principal curvature radii of meniscus of the oil and water phases; r represents a radius of a capillary; and $\theta_r$ represents a contact angle.

Figure 10:
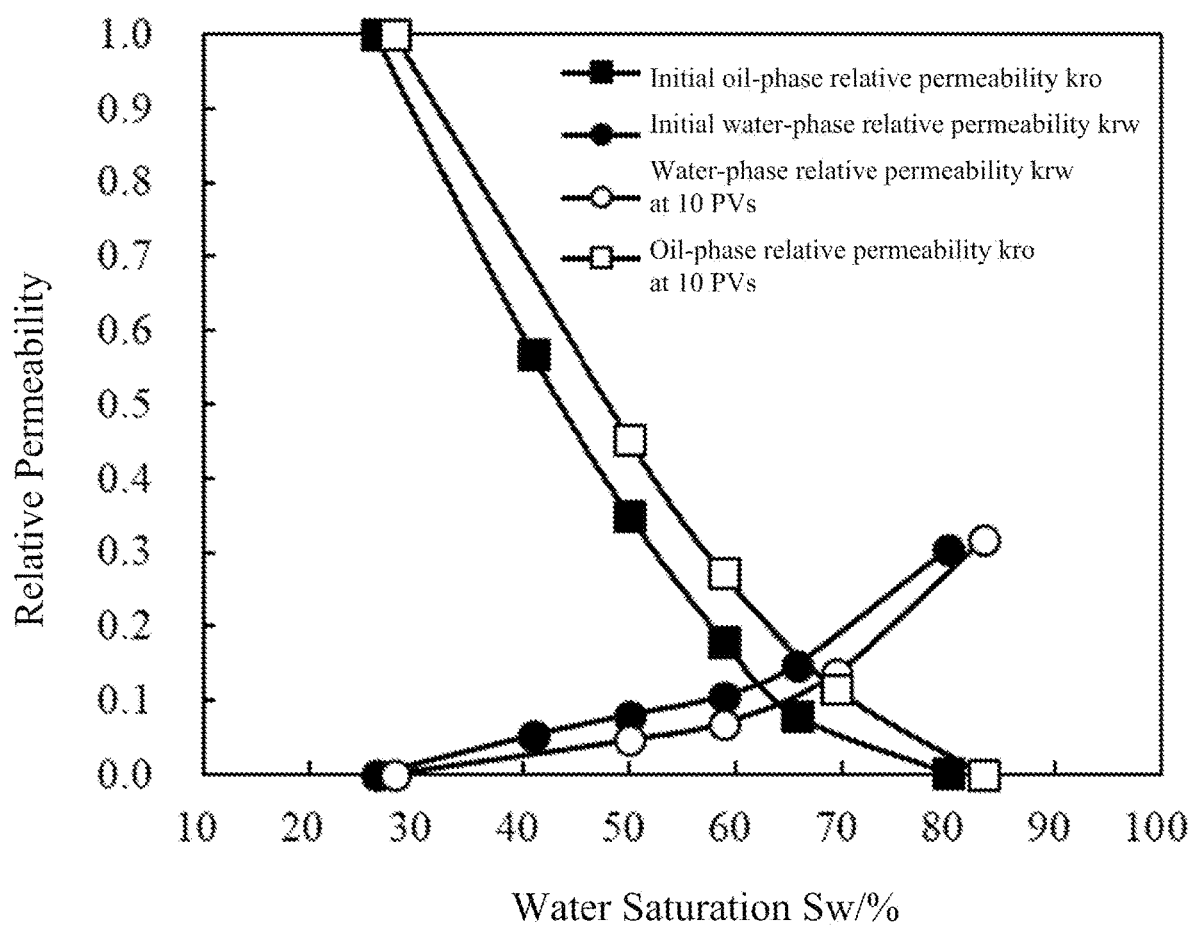
FIG. 10 is a schematic diagram of oil-water two-phase relative permeability curves of a rock sample at 0 PV of injected water and 10 PVs of injected water according to Example 3 of the present disclosure.

S62: a water saturation, an oil-phase relative permeability, and a water-phase relative permeability are calculated to obtain corresponding oil-water two-phase relative permeability curves of the rock sample at different PV multiples of injected water, as shown in FIG. 10.

Calculation of water saturation: the water saturation of the whole pore network model is a ratio of the volume of the water phase in all pores and throats to the total volume of the pores and throats, and the formula is as follows:

$$s_w = \frac{\sum_{h=1}^{n} V_{hw}}{\sum_{h=1}^{n} V_h}$$

where $s_w$ represents a water saturation; n represents the total number of pores and throats in the pore network model; $V_{hw}$ represents a volume of the water phase in pore or throat h; and $V_h$ represents a volume of the hth pore or throat.

Calculation of permeability: an absolute permeability is calculated by Darcy equation as follow:

$$k_j = \frac{\mu_w q_w L}{A \Delta p}$$

where $k_j$ represents an absolute permeability; $\mu_w$ represents a viscosity of saturated water; $q_w$ represents a flow rate of single-phase water passing through the pore network model; L represents a length of the pore network model; A represents a sectional area of the pore network model; and $\Delta P$ represents a pressure difference between an inlet and an outlet of the pore network model.

A pore network model of oil-drive fully saturated water is used according to the requirements of displacement conditions until no water comes out of the model, and an effective permeability of oil phase in a connate water state $k_o(s_{wc})$ is established, with the equation being as follows:

$$k_o(s_{wc}) = \frac{\mu_o q_o L}{A \Delta p}$$

where $k_o(s_{wc})$ represents an effective permeability of oil phase in a connate water state; $\mu_o$ represents a viscosity of the oil phase; $q_o$ represents a flow rate of the oil phase passing through the pore network model; L represents a length of the pore network model; A represents a sectional area of the pore network model; and $\Delta P$ represents a pressure difference between an inlet and an outlet of the pore network model.

Water driving oil simulation is performed. The flow rates of the oil and water phases in the pore network model and the pressure difference between the two ends of the model are accurately recorded, and the effective permeability of each phase when the oil and water phases coexist is calculated by the following equation:

$$k_o = \frac{\mu_o q_o L}{A \Delta p}$$

$$k_w = \frac{\mu_w q_w L}{A \Delta p}$$

where $k_o$ and $k_w$ represent the effective permeabilities of the oil phase and the water phase, respectively.

As the oil-water two-phase flow simulation proceeds, when the water cut reaches 99.95% or after the water injection amount reaches 30 times PV (it needs to be noted that this is merely an example, and the specific value will not be limited herein), the effective permeability of the water phase in residual oil is calculated by the following equation:

$$k_w(s_{or}) = \frac{\mu_w q_w L}{A \Delta p}$$

where $k_w(s_{or})$ represents an effective permeability of water-phase at the residual oil; $\mu_w$ represents a viscosity of the water phase; $q_w$ represents a flow rate of the water phase passing through the pore network model; L represents a length of the pore network model; A represents a sectional area of the pore network model; and $\Delta P$ represents a pressure difference between an inlet and an outlet of the pore network model.

Relative permeabilities of the oil phase and the water phase at a corresponding water saturation are calculated by the following equation:

$$k_{rl} = \frac{k_l}{k_j}$$

where $k_{rl}$ represents a relative permeability of l phase; $k_l$ represents an effective permeability of l phase; and $k_j$ represents an absolute permeability.

Example 4

This example provides a system for predicting a time-varying principle of waterflooding oil reservoir formation parameters, including:

a relation model building module configured to build a relation model of a transverse relaxation time $T_2$ spectrum and a pore size;

a prediction model building module configured to build a mathematical prediction model of a pore size distribution changing with a PV multiple of injected water, an initial permeability of a rock sample, a flow rate of injected water, a porosity, a clay content, a clay mineral content, and a median particle size;

a pore network model building module configured to build a pore network model of a rock core sample at different PV multiples of injected water and perform oil-water two-phase flow simulation to obtain an oil-water two-phase relative permeability curve of the rock sample at different PV multiples.

The relation model building module is specifically configured to:

for an arbitrary standard rock core sample, obtain that an injection pressure is inversely proportional to a size of an mercury entry pore by a high pressure mercury intrusion experiment; for a cylindrical hole, convert pressures into pore sizes by using Washburn equation to obtain a pore size distribution;

by nuclear magnetic resonance experiments, set measurement parameters for a transverse relaxation time $T_2$ of nuclear magnetic resonance of a given rock sample, including an echo spacing, a complete recovery time, a count of echoes, a count of scans, and an acceptance benefit, and after the measurement of the transverse relaxation time $T_2$ by a CPMG pulse sequence, calculate a transverse relaxation time $T_2$ distribution;

set a conversion coefficient C, and use the relation model of a relaxation time $T_2$ spectrum and a pore size, with the equation being as follows:

$r = CT_2$ where C represents a conversion coefficient; r represents a pore radius; and $T_2$ represents a transverse relaxation time;

calculate a pore size distribution according to the transverse relaxation time $T_2$ spectrum and the conversion coefficient C; and compare the calculated pore size distribution with a measured pore size distribution curve, determine whether first peak values of the pore size distribution curves coincide, and if not, adjust the value of the conversion coefficient C until the first peak values of the pore size distribution curves coincide.

The prediction model building module is specifically configured to:

conduct a waterflooding experiment, and measure a porosity of a rock core and an initial permeability measured with water;

continuously inject water, and record pressure differences between two ends of the rock sample and flow rates through the rock sample at different PV multiples of injected water, and calculate permeability changes at different PV multiples of injected water by Darcy equation;

obtain a $T_2$ spectrum at different PV multiples of injected water by a nuclear magnetic resonance test;

construct the following equation by using the calculated value of the conversion coefficient C according to the relation model of a relaxation time $T_2$ spectrum and a pore size: $r = CT_2$, where C represents the conversion coefficient; r represents a pore radius; and $T_2$ represents a transverse relaxation time;

convert the nuclear magnetic resonance $T_2$ spectrum of the test rock sample at different PV multiples of injected water into a pore size distribution to obtain a pore size distribution curve at different PV multiples of injected water;

take the pore size distribution curve at different PV multiples of injected water as a superposition of n normal distribution functions, and calculate a mathematical expectation and a standard deviation of a normal distribution implicit parameter variable by the EM algorithm;

for the pore size distribution curve at a given PV, calculate parameters corresponding to normal distribution functions by the EM algorithm as $\mu_{g1}, \sigma_{g1}, \mu_{g2}, \sigma_{g2}, \ldots, \mu_{gn}, o_{gn}$, respectively, with g being the PV of injected water;

build a functional relationship of a mathematical expectation of each normal distribution function with a PV multiple of injected water, an initial permeability of the rock sample, a flow rate of injected water, a porosity, a clay content, and a median particle size;

build a functional relationship of a standard deviation of each normal distribution function with a PV multiple of injected water, an initial permeability of the rock sample, a flow rate of injected water, a porosity, a clay content, and a median particle size;

The methods for building the functional relationships of the mathematical expectation and the standard deviation with different parameters include but are not limited to multivariate linear regression, XGBoost, support vector machine, random forest, and the like.

Thus, the pore size distribution function at different PV multiples of injected water may be obtained by the following equation:

$$f(x) = \sum_{i=1}^{n} \frac{1}{\sqrt{2\pi}\,\sigma_{gi}} \exp\left(-\frac{(x - \mu_{gi})^2}{2\sigma_{gi}^2}\right)$$

where $\sigma_{gi}$ represents a standard deviation of a pore size distribution at different PV multiples of injected water; and $\mu_{gi}$ represents a mathematical expectation of a pore size distribution at different PV multiples of injected water.

The pore network model building module is specifically configured to:

build a pore network model according to the pore size distribution;

simulate a pore network of single-phase water, and calculate a model permeability;

compare the model permeability with a permeability measured by an experiment at different PV multiples to determine whether the two are consistent;

if not consistent, adjust the physical parameters of the model such as a pore and throat distribution and a porosity until the model permeability and the measured permeability are consistent, thereby obtaining the pore network model at different PV multiples of injected water;

select an appropriate displacement velocity or displacement pressure difference to perform oil-water two-phase flow simulation according to the requirements of displacement conditions by means of the pore network model at different PV multiples of injected water in combination with a quasi-static network simulation method;

accurately record the flow rates of the oil and water phases in the pore network model and the pressure difference between the two ends of the model, and calculate the effective permeability of each phase when the oil and water phases coexist;

as the oil-water two-phase flow simulation proceeds, measure the effective permeability of the water phase in residual oil when the water cut reaches 99.95% or after the water injection amount reaches 30 PVs;

calculate relative permeabilities of the oil phase and the water phase at a corresponding water saturation to obtain a corresponding oil-water two-phase relative permeability curve of the rock sample at different PVs of injected water.

The method for predicting a time-varying principle of waterflooding oil reservoir formation parameters provided in this example solves the problem of simultaneously measuring a permeability changing principle and a relative permeability curve changing principle of a rock sample and improves the accuracy of time-varying prediction of formation parameters, and can provide more effective support for oil reservoir development and adjustment.

The examples of the present specification are described in a progressive manner. Each example focuses on the difference from other examples, and the same and similar parts between the examples may refer to each other. Since the system disclosed in the examples corresponds to the method disclosed in the examples, the description is relatively simple, and reference can be made to the method description with respect to the related parts.

Specific examples are used herein to set forth the principles and embodiments of the present disclosure. The descriptions of the above examples are merely intended to assist in understanding the method of the present disclosure and its core ideas. In addition, those of ordinary skill in the art can make various modifications in terms of the specific embodiments and the scope of application in accordance with the ideas of the present disclosure. In conclusion, the contents of the present specification shall not be construed as limitations to the present disclosure.

What is claimed is:

1. A method for predicting a time-varying principle of a waterflooding oil reservoir formation parameters, comprising:
   acquiring a measured pore size distribution curve and a measured $T_2$ spectrum of a rock sample of a waterflooding oil reservoir;
   setting a conversion coefficient C, and building a measured $T_2$ spectrum-pore size relation model by using a relation model of a relaxation time $T_2$ spectrum and a pore size distribution according to the measured pore size distribution curve and the measured $T_2$ spectrum;
   acquiring a $T_2$ spectrum of the rock sample at different water injection amounts during a waterflooding physical simulation experiment and an actual permeability of the rock sample at different water injection amounts;
   obtaining a pore size distribution curve at different water injection amounts by using the measured $T_2$ spectrum-pore size relation model according to the $T_2$ spectrum of the rock sample at different water injection amounts;
   building a mathematical model of the pore size distribution curve changing with water injection parameters of the rock sample in combination of normal distribution functions according to the pore size distribution curve at different water injection amounts, wherein the water injection parameters of the rock sample comprise a water injection amount, an initial permeability of the rock sample, an average water injection rate, an initial porosity, a clay type, an initial clay content, and a median particle size;
   building a pore network model at different water injection amounts according to the mathematical model; and
   performing oil-water two-phase flow simulation by using the pore network model at different water injection amounts, and calculating a corresponding oil-water two-phase relative permeability curve of the rock sample at different water injection amounts, wherein the oil-water two-phase relative permeability curve is the formation parameters in the waterflooding oil reservoir;
   wherein after the building a pore network model at different water injection amounts according to the mathematical model, the method further comprises:
   simulating a pore network of single-phase water by using the pore network model;
   acquiring a pressure difference between two ends of the simulated pore network and a flow;
   calculating a model permeability by Darcy equation according to the pressure difference and the flow;
   determining whether the model permeability is the same as the actual permeability; if not, adjusting physical parameters of the pore network model, and returning to the step "simulating a pore network of single-phase water by using the pore network model" until the model permeability is the same as the actual permeability; and
   the performing oil-water two-phase flow simulation by using the pore network model at different water injection amounts and calculating a corresponding oil-water two-phase relative permeability curve of the rock sample at different water injection amounts specifically comprises:
   performing oil-water two-phase flow simulation, using a pore network model of oil-drive fully saturated water until no water comes out of the pore network model, and establishing an effective permeability of oil phase in a connate water state $$k_o(s_{wc}):k_o(s_{wc}) = \frac{\mu_o q_o L}{A \Delta p},$$

wherein $\mu_o$ represents a viscosity of an oil phase; $q_o$ represents a flow of the oil phase passing through the pore network model; L represents a length of the pore network model; A represents a sectional area of the pore network model; and $\Delta P$ represents a pressure difference between an inlet and an outlet of the pore network model;
   conducting a water driving oil simulation experiment, obtaining flows of oil and water phases and a pressure difference between two ends of the pore network model, calculating an effective permeability of each phase when the oil and water phases coexist by the following formulas:

$$k_o = \frac{\mu_o q_o L}{A \Delta p}, \text{ and } k_w = \frac{\mu_w q_w L}{A \Delta p},$$

wherein $k_o$ and $k_w$ represent effective permeabilities of the oil and water phases, respectively; $\mu_w$ represents a viscosity of the water phase; and $q_w$ represents a flow of the water phase passing through the pore network model;
   when a water cut reaches 99.95% or after the water injection amount reaches 30 times pore volume (PV), calculating an effective permeability of the water phase in a residual oil state by the following equation:

$$k_w(s_{or}) = \frac{\mu_w q_w L}{A \Delta p},$$

wherein $k_w(s_{or})$ represents the effective permeability of the water phase in the residual oil state.

2. The method for predicting a time-varying principle of waterflooding oil reservoir formation parameters according to claim 1, wherein the acquiring a measured pore size distribution curve and a measured $T_2$ spectrum of a rock sample of a waterflooding oil reservoir specifically comprises:
   acquiring the measured pore size distribution curve of the rock sample by a high pressure mercury intrusion method;
   acquiring the measured $T_2$ spectrum of the rock sample by a nuclear magnetic resonance method.

3. The method for predicting a time-varying principle of waterflooding oil reservoir formation parameters according to claim 1, wherein the setting a conversion coefficient C, and building a measured $T_2$ spectrum-pore size relation model by using a relation model of a relaxation time $T_2$ spectrum and a pore size distribution according to the measured pore size distribution curve and the measured $T_2$ spectrum specifically comprises:

setting a conversion coefficient C;
calculating a pore size distribution curve by using a $T_2$ spectrum-pore size relation model according to the measured $T_2$ spectrum and the conversion coefficient C, wherein the $T_2$ spectrum-pore size relation model is r=C$T_2$, wherein C represents the conversion coefficient; r represents a pore radius; and $T_2$ represents a transverse relaxation time;
determining whether first peak values of the pore size distribution curve and the measured pore size distribution curve coincide; if not, adjusting a value of the conversion coefficient C, and returning to the step "calculating a pore size distribution curve by using a $T_2$ spectrum-pore size relation model according to the measured $T_2$ spectrum and the conversion coefficient C" until the first peak values of the pore size distribution curve and the measured pore size distribution curve coincide, thereby obtaining the measured $T_2$ spectrum-pore size relation model.

4. The method for predicting a time-varying principle of waterflooding oil reservoir formation parameters according to claim 1, wherein the building a mathematical model of the pore size distribution curve changing with water injection parameters of the rock sample in combination of normal distribution functions according to the pore size distribution curve at different water injection amounts specifically comprises:

taking the pore size distribution curve at different water injection amounts as a superposition of a number of normal distribution functions, wherein the number of the normal distribution functions is the same as the number of peak values on the pore size distribution curve;
calculating a mathematical expectation and a standard deviation of each normal distribution function;
building a functional relationship of the mathematical expectation and the standard deviation of the normal distribution function with the water injection parameters of the rock sample, thereby obtaining the mathematical model of the pore size distribution curve changing with the water injection parameters of the rock sample.

5. The method for predicting a time-varying principle of waterflooding oil reservoir formation parameters according to claim 4, wherein the calculating a mathematical expectation and a standard deviation of each normal distribution function specifically comprises:

calculating the mathematical expectation and the standard deviation of each normal distribution function by using an expectation-maximization (EM) algorithm.

6. A system for predicting a time-varying principle of waterflooding oil reservoir formation parameters, comprising:

an initial data acquiring module configured to acquire a measured pore size distribution curve and a measured $T_2$ spectrum of a rock sample of a waterflooding oil reservoir;
a model building module configured to set a conversion coefficient C, and build a measured $T_2$ spectrum-pore size relation model by using a relation model of a relaxation time $T_2$ spectrum and a pore size distribution according to the measured pore size distribution curve and the measured $T_2$ spectrum;
a $T_2$ spectrum acquiring module configured to acquire a $T_2$ spectrum of the rock sample at different water injection amounts during a waterflooding physical simulation experiment and an actual permeability of the rock sample at different water injection amounts;
a pore size distribution curve creating module configured to obtain a pore size distribution curve at different water injection amounts by using the measured $T_2$ spectrum-pore size relation model according to the $T_2$ spectrum of the rock sample at different water injection amounts;
a mathematical model building module configured to build a mathematical model of the pore size distribution curve changing with water injection parameters of the rock sample in combination of normal distribution functions according to the pore size distribution curve at different water injection amounts, wherein the water injection parameters of the rock sample comprise a water injection amount, an initial permeability of the rock sample, an average water injection rate, an initial porosity, a clay type, an initial clay content, and a median particle size;
a pore network model building module configured to build a pore network model at different water injection amounts according to the mathematical model;
wherein after the building a pore network model at different water injection amounts according to the mathematical model, the pore network model building module is further configured to:
simulate a pore network of single-phase water by using the pore network model;
acquire a pressure difference between two ends of the simulated pore network and a flow;
calculate a model permeability by Darcy equation according to the pressure difference and the flow;
determine whether the model permeability is the same as the actual permeability; if not, adjust physical parameters of the pore network model, and return to the step "simulating a pore network of single-phase water by using the pore network model" until the model permeability is the same as the actual permeability;
a permeability calculating module configured to perform oil-water two-phase flow simulation by using the pore network model at different water injection amounts, and calculate a corresponding oil-water two-phase relative permeability curve of the rock sample at different water injection amounts, wherein the oil-water two-phase relative permeability curve is the formation parameters in the waterflooding oil reservoir; wherein the process of performing oil-water two-phase flow simulation by using the pore network model at different water injection amounts and calculating a corresponding oil-water two-phase relative permeability curve of the rock sample at different water injection amounts specifically comprises:
performing oil-water two-phase flow simulation, using a pore network model of oil-drive fully saturated water until no water comes out of the pore network model, and establishing an effective permeability of oil phase in a connate water state $$k_o(s_{wc}):k_o(s_{wc}) = \frac{\mu_o q_o L}{A \Delta p},$$

wherein $\mu_o$ represents a viscosity of an oil phase; $q_o$ represents a flow of the oil phase passing through the pore network model; L represents a length of the pore network model; A represents a sectional area of the pore network model; and $\Delta P$ represents a pressure difference between an inlet and an outlet of the pore network model;

conducting a water driving oil simulation experiment, obtaining flows of oil and water phases and a pressure difference between two ends of the pore network model, calculating an effective permeability of each phase when the oil and water phases coexist by the following formulas:

$$k_o = \frac{\mu_o q_o L}{A \Delta p}, \text{ and } k_w = \frac{\mu_w q_w L}{A \Delta p},$$

wherein $k_o$ and $k_w$ represent effective permeabilities of the oil and water phases, respectively; $\mu_w$ represents a viscosity of the water phase; and $q_w$ represents a flow of the water phase passing through the pore network model;

when a water cut reaches 99.95% or after the water injection amount reaches 30 times pore volume (PV), calculating an effective permeability of the water phase in a residual oil state by the following equation:

$$k_w(s_{or}) = \frac{\mu_w q_w L}{A \Delta p},$$

wherein $k_w(s_{or})$ represents the effective permeability of the water phase in the residual oil state.

* * * * *